United States Patent [19]

Casas

[11] 4,320,059
[45] Mar. 16, 1982

[54] PROCESS FOR THE MANUFACTURE OF PHTHALOCYANINES

[75] Inventor: Baldomero Casas, White House Station, N.J.

[73] Assignee: American Cyanamid Company, Stamford, Conn.

[21] Appl. No.: 205,227

[22] Filed: Nov. 10, 1980

[51] Int. Cl.³ .............................................. C07B 47/06
[52] U.S. Cl. .................................................. 260/314.5
[58] Field of Search ..................................... 260/314.5

[56] References Cited

U.S. PATENT DOCUMENTS

| 2,302,612 | 11/1942 | Lacey | 260/314.5 |
| 2,318,783 | 5/1943 | King et al. | 260/314.5 |
| 2,318,787 | 5/1943 | Lacey | 260/314.5 |
| 2,375,780 | 5/1945 | Giambalvo | 260/314.5 |
| 4,102,892 | 7/1978 | Baurecht | 260/314.5 |
| 4,118,391 | 10/1978 | Baurecht | 260/314.5 |

OTHER PUBLICATIONS

Moser et al., Phthalocyanine Compounds, pp. 145–146 and 151–152, Reinhold Publishing Corporation, N.Y. 1963.

*Primary Examiner*—Richard Raymond
*Attorney, Agent, or Firm*—Bruce F. Jacobs

[57] ABSTRACT

Phthalocyanine compounds useful as pigments are prepared under a positive pressure of ammonia gas.

6 Claims, No Drawings

PROCESS FOR THE MANUFACTURE OF PHTHALOCYANINES

This invention relates to the production of phthalocyanine compounds for pigments and, in particular, to an improved process therefor. The process of the invention is characterized as a well-agitated, modified "bake" process conducted under a positive pressure of ammonia gas.

A commonly used method for the manufacture of phthalocyanine compounds has been the so-called "bake" process. The raw materials used are dependent on the product required, but in all cases phthalic anhydride (PAN), or a derivative of phthalic anhydride, such as phthalimide, phthalamide, ammonium phthalate and phthalonitrile, is used. When a substituted phthalocyanine product is required, such as chlorinated phthalocyanines, the corresponding substituted phthalic anhydride, or its derivative, is used. The two most important phthalocyanine products are the commercial pigments copper phthalocyanine blue and copper phthalocyanine green. The present invention is directed primarily at copper phthalocyanine blue, but is also applicable to the production of the broader range of phthalocyanine compounds. When unsubstituted copper phthalocyanine blue is made, the raw materials used are phthalic anhydride, urea, a copper compound, such as cuprous chloride or basic copper sulfate, and a catalyst, such as a molybdenum (sodium or ammonium molybdate) or zirconium salt. Other combinations may also be used, such as phthalonitrile and copper or copper compound. These raw materials, which are solids, are well mixed and baked in ovens at about 170°–210° C., or higher, for several hours. During the reaction period, the materials go through various changes, such as melting, foaming, solidifying, and finally ending as a brittle cake containing about 50% copper phthalocyanine, by-products believed to be nitrogenous derivatives of phthalic anhydride, various compounds derived from urea alone, and certain unknown compounds containing copper and catalyst. Because of the tendency of the reaction mixture to fuse, sticking to the container surface has been a problem. As a result, it has been conventional practice to bake the mixed raw materials as a stationary bed, for example, in pan-loaded baking ovens.

The yields in the "bake" process are invariably low, ranging from about 40% to 80% and in an inconsistent manner. The gases which evolve from the reaction mixture, which should consist only of ammonia and $CO_2$, are known to contain these gases, along with volatile compounds of phthalic anhydride, such as phthalimide. It is believed that the inconsistent results which are obtained in the "bake" process are caused by poor heat transfer through the viscous reaction mixture, foaming, stratifying of the components, and local overheating.

An alternative method for making phthalocyanine compounds is known as the "solvent" process. In this method, the raw materials are suspended in an organic liquid medium, such as nitrobenzene, and reacted at about 200° C. Phthalonitrile, or its substituted products, are generally used because they result in yields of over 95%. While the "solvent" method produces much higher yields than the conventional "bake" process, it suffers from higher raw materials and production costs. The organic liquid must be removed from the phthalocyanine compound, usually involving a distillation step, and recycled to keep costs reasonable. From the standpoint of manufacture, the "bake" process is attractive, and many attempts have been made to operate it on a commercial scale.

Examples of previous processes for preparing phthalocyanines may be found in such as:

U.S. Pat. No. 2,964,532 discloses passing a thin layer of premixed reactants between and in contact with the inner surface of a cylinder and the surface of a screw rotating within the cylinder. The thickness of the layer ranges from about $\frac{1}{4}''$ to $\frac{1}{2}''$ and is essential to the conduct of the process. This process has unfavorable space-time yields and requires expensive equipment.

U.S. Pat. No. 3,188,318 meters a mixture of phthalic anhydride, urea, $Cu_2Cl_2$ and ammonium molybdate into a heated rotary drum containing an amount of a previously prepared granular copper phthalocyanine compound equal to about 2 hours of throughput. This process is not practical from a manufacturing standpoint.

U.S. Pat. No. 3,280,142 utilizes a rotary mill, such as a ball mill or trunnion rod mill. The process is disadvantageous because it is necessary to cool the reaction mass before the mill is emptied. The cycle time is 90 to 180 minutes, although the reaction time is only 5 to 45 minutes.

U.S. Pat. No. 4,102,892, described a process whereby the reactor of U.S. Pat. No. 4,118,391, is used, the distinction being the separate feeding of phthalic anhydride and urea in liquid form. The U.S. Pat. No. 4,102,892 patent requires a special piece of equipment having very specific characteristics.

Finally, U.S. Pat. No. 4,173,568 requires heating the reactions on a belt in a thin layer so that the average rise in temperature does not exceed 2° C./minute.

None of the processes described utilize ammonia pressure, or any pressure at all.

Consequently, a method by which the simple fusion process could be operated economically would be of great practical importance.

This invention is based on the discovery that when the dry components of the reaction mixture, that is, the phthalic anhydride compound, the urea compound, the metal-containing compound and a catalyst, are continuously agitated at conventional reaction temperatures under a positive pressure of ammonia, the product phthalocyanine compound is obtained as a dry, free-flowing granular powder in a high yield and having high purity.

The invention provides a process which eliminates the objections of the "bake" process and gives yield equivalent to those obtained in the "solvent" process, but avoids the use of a liquid organic medium and the problems associated therewith.

The reactants which may be employed in the process of the invention comprise phthalic anhydride or its derivatives, urea or its derivatives such as biuret or the like, and a metal or non-organic metal salt which furnishes the metal for the metal-containing phthalocyanine. A molybdenum catalyst, such as sodium or ammonium molybdate is usually employed as part of the reaction mixture. Derivatives of phthalic anhydride useful herein include such as phthalic acid, a monoether, or ammonium salt, a mono or diamide or imide thereof. Substituted phthalic compounds include mono-, di-, tri-halo phthalic acids and their corresponding derivatives, nitrophthalic acids and their derivatives, the benzene tri- and tetracarboxylic acids, and the like.

In addition to urea, other nitrogen-containing compounds may be employed, such as formamide, dicyandiamide, ammonium carbonate, ammonium carbamate, guanidine, thioureas, carbonyl urea, methylolurea, ammelin, ammelide, cyanuric acid and cyanamide.

Metal or organic metal salt compounds which furnish the metal for the phthalocyanine compounds include such as copper, cuprous chloride, cupric chloride, and cuprous oxide, and the like.

The temperatures employed in the process have not been found to be critical, but best results have been obtained in the range of about 180° C. to 300° C., preferably about 180° C. to 300° C., preferably about 180° C. to 250° C. The reaction, however, proceeds at temperatures below 180° C., but resulting in a lower yield and quality of product.

In the reaction of phthalic anhydride and urea, the phthalic anhydride to urea mol ration should be that which is conventionally used, i.e. in the range of about 1:2 to 1:5, preferably about 1:3 to 1:4.

In accordance with this invention, the reaction time will largely depend on the reaction temperature; assuming that the reaction mixture is well agitated throughout, the reaction times at the preferred reaction temperatures will range from about 1 to 4 hours.

The agitation of the reaction mass throughout and the use of a positive pressure of ammonia are critical to achievement of a free-flowing, dry solid product in high yield and purity.

The type of agitation required for good results provides and permits intimate grinding and shearing of the ingredients during all stages of the reaction and must be such as to permit conducting the reaction under a pressure of ammonia of from about 40 psig to about 200 psig. However, at the lower pressures, yields will tend to be lower. Preferably, pressures will range from about 100 psig to 175 psig. Higher pressures may be used; however, no benefit has been found from so doing. Various mixer-reactors providing the required agitation are available commercially and some have been described in the literature. Rotary type reactor-mixers which, continually scrape the reaction mixture from the walls, may be used. A suitable mixer is a Helicone mixer, sold by Atlantic Research Co.

EXAMPLE 1

A Helicone reactor was charged with 500 parts by weight of phthalic anhydride, 671.25 parts by weight of urea, 62.5 parts by weight of cuprous oxide (96–97% real), and 5.63 parts by weight of sodium molybdate. The reactor was pressurized with ammonia to about 150 psig and the reactor was heated with vigorous agitation to a temperature of 210° C. and held at 210° C. for a total of 2 hours. The gases were vented continuously to maintain a pressure of about 175 psig during the reaction. The reaction mixture was then cooled to about 100° C., while continuing to stir the mixture. A free-flowing granular powder was discharged after venting the pressure. There was obtained 553 parts of crude copper phthalocyanine product, having a purity, by visual spectroscopy, of 85.4%, represented a yield, based on phthalic anhydride, of 97%.

COMPARISON EXAMPLE

The procedure of Example 1 is conducted in every detail except that the reaction is run at atmospheric pressure and the evolved gases, consisting of ammonia, carbon dioxide, water vapor and sublimed phthalic derivatives, are continuously vented to the atmosphere. There is obtained about 550 parts by weight of a crude copper phthalocyanine product having a purity, by visual spectroscopy, of about 62%, representing a yield of about 70%, based on phthalic anhydride.

What is claimed is:

1. In a process for the production of a metal phthalocyanine by fusion of phthalic anhydride or a derivative thereof, urea or a derivative thereof, a metal-yielding compound and a molybdenum catalyst, the improvement which comprises: conducting said reaction in a vigorously agitated reaction vessel under a pressure of about 40 to 200 psig of ammonia gas; said agitation being such that the reactants are at all times in intimate contact and such that said metal phthalocyanine product is obtained as a dry, free-flowing granular powder.

2. The process of claim 1 wherein said process is from 100 to 175 psig of ammonia.

3. The process of claim 1 wherein the reactants are heated at a temperature of about 180° C. to 300° C.

4. The process of claim 1 wherein the reactants are heated at a temperature of about 180° C. to 250° C.

5. The process of claim 1 wherein said metal phthalocyanine is copper phthalocyanine and said metal-yielding compound is cuprous oxide.

6. The process of claim 1 wherein the mol ratio of phthalic anhydride or its derivative to urea or its derivative is from about 1:2 to 1:5.

* * * * *